US008671895B2

(12) United States Patent
Inden

(10) Patent No.: US 8,671,895 B2
(45) Date of Patent: Mar. 18, 2014

(54) VARIABLE COMPRESSION RATIO APPARATUS WITH RECIPROCATING PISTON MECHANISM WITH EXTENDED PISTON OFFSET

(76) Inventor: Michael Inden, Belmont, CA (US)

( * ) Notice: Subject to any disclaimer, the term of this patent is extended or adjusted under 35 U.S.C. 154(b) by 0 days.

(21) Appl. No.: 13/540,166

(22) Filed: Jul. 2, 2012

(65) Prior Publication Data

US 2013/0312710 A1 Nov. 28, 2013

Related U.S. Application Data

(63) Continuation-in-part of application No. 13/477,815, filed on May 5, 2012.

(51) Int. Cl.
*F02B 75/04* (2006.01)
*F16H 21/20* (2006.01)

(52) U.S. Cl.
USPC ..... 123/48 B; 123/48 R; 123/78 E; 123/78 F; 123/197.4; 74/40; 74/45

(58) Field of Classification Search
USPC ............... 74/40, 45; 92/140; 123/48 B, 48 R, 123/73 AC, 197.4, 48 A, 78 E, 78 F
See application file for complete search history.

(56) References Cited

U.S. PATENT DOCUMENTS 2,873,611 A * 2/1959 Biermann ......................... 74/40
4,821,695 A * 4/1989 Freudenstein ............. 123/197.4
5,163,386 A 11/1992 Schechter
5,443,043 A 8/1995 Nilsson et al.
5,562,068 A 10/1996 Sugimoto et al.
5,960,750 A 10/1999 Kreuter
6,202,622 B1 3/2001 Raquiza, Jr.
6,202,623 B1 3/2001 Ehrlich
6,588,384 B2 7/2003 Yapici
6,752,105 B2 6/2004 Gray, Jr.
7,047,917 B2 5/2006 Akihisa et al.
7,174,865 B2 2/2007 Sakita
8,074,612 B2 12/2011 Shin et al.
8,074,613 B2 12/2011 Lee et al.
8,122,860 B2 2/2012 Kamiyama et al.
8,127,739 B2 3/2012 Kono et al.
8,136,489 B2 3/2012 Kamiyama et al.
8,166,928 B2 5/2012 Moro
8,166,929 B2 5/2012 Pattakos et al.
8,166,930 B2 5/2012 Cho et al.
2009/0132671 A1* 5/2009 Chkodrov et al. ............ 709/206

* cited by examiner

*Primary Examiner* — Lindsay Low
*Assistant Examiner* — Kevin Lathers

(57) ABSTRACT

A variable compression ratio apparatus with means to vary compression ratio of an internal combustion engine is provided. The variable compression ratio apparatus with reciprocating piston mechanism with extended piston offset of the invention has a rocker arm/lever assembly pivotally mounted on a crankpin of a crankshaft and a fulcrum which moves along only within confines of a pathway/guide. This confined pathway/guide itself can be either pivoted to swing from side to side on a pivot or can move only along a predefined path towards the crankshaft and away in its own defined tracks. A swing or move of the pathway/guide leads to a corresponding change in stroke positions of the piston within the cylinder. Such construction allows a simple and easy way to vary compression ratio of the engine. At the same time all benefits of the reciprocating piston mechanism with extended piston offset are preserved.

3 Claims, 3 Drawing Sheets

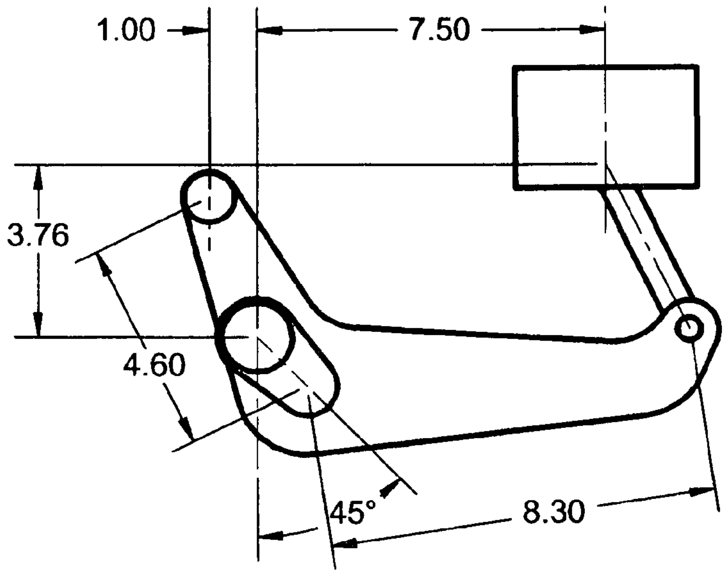
FIG. 5 1" Pathway/Guide Offset
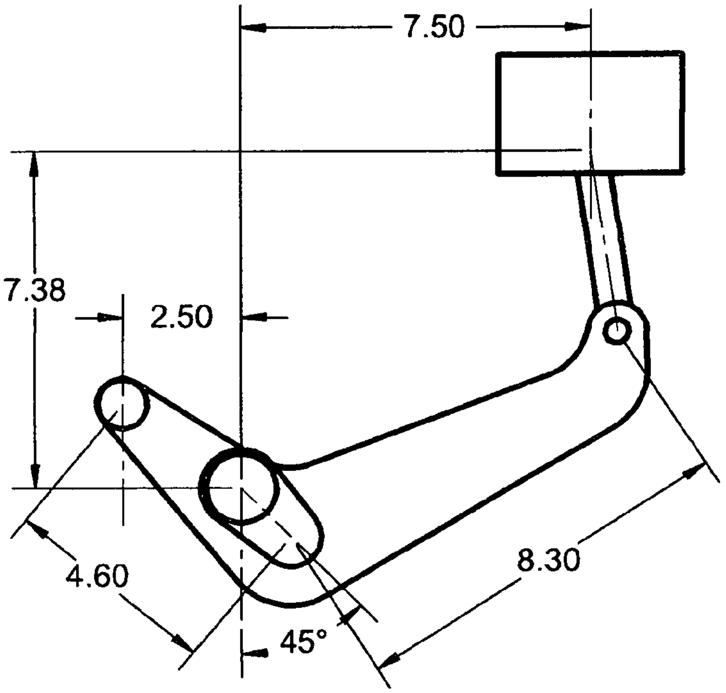
FIG. 6 2.5" Pathway/Guide Offset

VARIABLE COMPRESSION RATIO APPARATUS WITH RECIPROCATING PISTON MECHANISM WITH EXTENDED PISTON OFFSET

CROSS-REFERENCE TO RELATED APPLICATIONS

This application is a continuation-in-part of U.S. patent application Ser. No. 13/477,815 of Michael Inden titled “RECIPROCATING PISTON MECHANISM WITH EXTENDED PISTON OFFSET”, filed May 5, 2012 which is incorporated herein.

TECHNICAL FIELD

The present invention relates to the general technical field of internal combustion engines (ICE), and in particular variable compression ratio engines capable of changing a compression ratio that is a ratio of a maximum value to a minimum value of a volume of a combustion chamber, the volume, changing with a reciprocal movement of a piston.

BACKGROUND OF THE INVENTION

Conventional gasoline engines operate at a fixed compression ratio, which is set low enough to prevent premature ignition of the fuel, or “knock,” at high power levels under fast acceleration, high speeds, or heavy loads and thus. However, most of the time gasoline engines operate at relatively low power levels under slow acceleration, lower speed, or light loads. If the compression ratio were increased at low-power operation, gasoline engines could achieve higher fuel efficiency.

In the last 100 years a multitude of engines with variable compression ratio (VCR) systems or VCR mechanisms have been proposed and designed to control and vary the volume of the combustion chamber of a cylinder in order to achieve improved fuel economy and increased engine power performance. Such VCR engines are designed to have a higher compression ratio during low load conditions, and a lower compression ratio during high load conditions. Known techniques include using “sub-chambers” and “sub-pistons” to vary the volume of a cylinder (see, for example, U.S. Pat. Nos. 8,166,929 and 8,136,489), varying the actual dimensions of all or a portion of a piston attached to a fixed length connecting rod (see U.S. Pat. No. 8,166,928), and use of eccentric rings or bushings either at the lower “large” end of a connecting rod or the upper “small” end of the connecting rod for varying the effective length of the connecting rod (see U.S. Pat. Nos. 5,562,068, 5,960,750 and 6,202,622).

Other techniques include use of different VCR mechanisms as well as use of eccentric rings or bushings to change position of a crankshaft of the engine in order to change positions of the top dead centre (TDC) and the bottom dead centre (BDC) and thus to vary the volume of the combustion chamber of the cylinder (see U.S. Pat. Nos. 6,202,623, 6,588,384 and 7,174,865).

The foregoing art, however, have weaknesses such as considerably increasing overall complexity of an engine which results in increased cost of manufacturing and maintenance, as well as increased response time for change in compression ratio or a restricted a range of compression ratio and often with added friction loses as well.

OBJECTS OF THE INVENTION

The present invention has been made in view of the above-described circumstance. It is an object of this invention to provide a compression ratio apparatus with a reciprocating piston mechanism with extended piston offset having means to vary compression ratio for internal combustion engines. It is an object of this invention to provide a compression ratio apparatus with a reciprocating piston mechanism with extended piston offset having means to vary within a wide range compression ratio for internal combustion engines.

It is an object of the invention to provide an improved compression ratio setting apparatus with quick response time to a request for change in compression ratio.

It is another object of this invention to provide a compression ratio apparatus with a reciprocating piston mechanism with extended piston offset for an internal combustion engine which increases fuel efficiency for the required said engine power output.

It is yet another object of the invention to provide an improved compression ratio varying apparatus with a reciprocating piston mechanism with extended piston offset for an internal combustion engine which is structurally simple and is easier to manufacture.

SUMMARY OF THE INVENTION

The Applicant has found that the principle of the reciprocating piston mechanism with extended piston offset as disclosed generally in the above mentioned pending U.S. patent application Ser. No. 13/477,815 of Michael Inden titled “RECIPROCATING PISTON MECHANISM WITH EXTENDED PISTON OFFSET”, filed May 5, 2012 can be enhanced by adding ability to vary compression ratio of an engine.

Realization of the aforementioned principle makes it possible to solve one of the most important problems confronted by engine manufacturers to-day, i.e., to provide a robust variable compression ratio engine which decreases response time to change compression ratio in response to fast changing load and driving conditions and at the same time increases a range of compression ratio in a simple, inexpensive, and efficient way.

The invention addresses the shortcomings of the prior art by providing a robust and simple adjustable reciprocating piston mechanism with extended piston offset for varying a compression ratio of an internal combustion engine. Typically, such an engine contains at least one cylinder having a longitudinal axis, at least one piston that has a wrist pin and is slidingly installed in the cylinder, a crankshaft having a central axis, which is offset at a distance from the longitudinal axis of the cylinder, a rocker arm assembly, which in essence is a second order lever, pivotally mounted on a crankpin of the crankshaft and a connecting rod connecting the piston and one arm of the rocker arm/lever assembly. The other arm of the rocker arm/lever assembly can move back and forth only within confines of a pathway or a guide and works as a stabilizer/rudder. This confined pathway/guide itself can be either pivoted to swing from side to side on the above mentioned pivot or can move only along its own predefined path towards and away from the crankshaft. In other words, a distinguishing feature of the variable compression ratio apparatus with reciprocating piston mechanism with extended piston offset of the invention is the rocker arm/lever assembly which is pivotally mounted on the crankpin of the crankshaft and a fulcrum which moves along only within confines of the pathway/guide, direction or position of which can be altered as required by working parameters of the engine during rotation of the driveshaft. The distance from the central axis of the crankshaft and the longitudinal axis of the cylinder is always greater than 0. Such a construction allows simple and easy variation of the compression ratio of the engine.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

FIGS. 5 & 6 are schematic diagrams of the same variable compression ratio apparatus of FIG. 4 with the pathway/guide in two different positions.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

For better understanding of the distinguishing features of the present invention, it would be appropriate again to refer to the structure of a rocker arm/lever mechanism used in an internal combustion engine which was disclosed in pending U.S. patent application Ser. No. 13/477,815 of Michael Inden titled “RECIPROCATING PISTON MECHANISM WITH EXTENDED PISTON OFFSET”, filed May 5, 2012 by the same applicant and the modifications which the present application is introducing.

Figure 1:
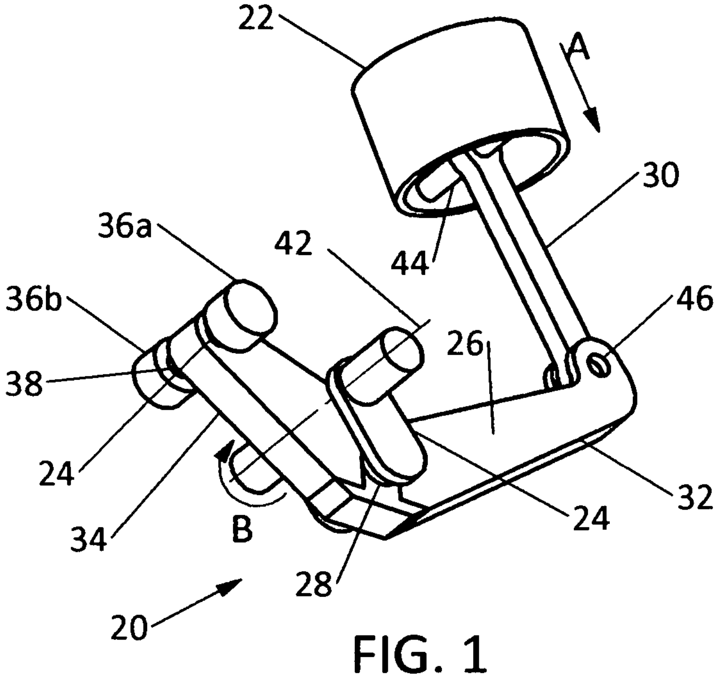
FIG. 1 Prior Art
FIG. 1 is a perspective view of an exemplary embodiment of the apparatus of the prior art of a reciprocating piston mechanism with extended piston offset for an inline internal combustion engine.

More specifically, FIG. 1 illustrates an exemplary embodiment of a reciprocating piston mechanism with extended piston offset which as a whole is designated by reference numeral 20. The mechanism 20 (for simplicity of the drawing and description, the cylinder block of an engine and other engine components are not shown), comprises a piston 22, a crankshaft 24, a rocker arm/lever assembly 26 pivotally mounted on a crankpin 28 of the crankshaft 24 and a connecting rod 30. The rocker arm/lever assembly 26, has one extended arm 32 pivotally connected to one end of the connecting rod 30 with a pin (not shown) and another extended arm 34 has a pivotally mounted pair of rollers 36*a* and 36*b* with a pin 38 in an opening 40 of the extended arm 34. The connecting rod 30 at its top distal end is pivotally connected to a wrist pin 44 of the piston 22. This assembly serves to convert the reciprocating motion of the piston 22 as indicated by arrow A to the rotational motion of the crankshaft 24 as indicated by arrow B about a crankshaft axis 42.

Figure 2:
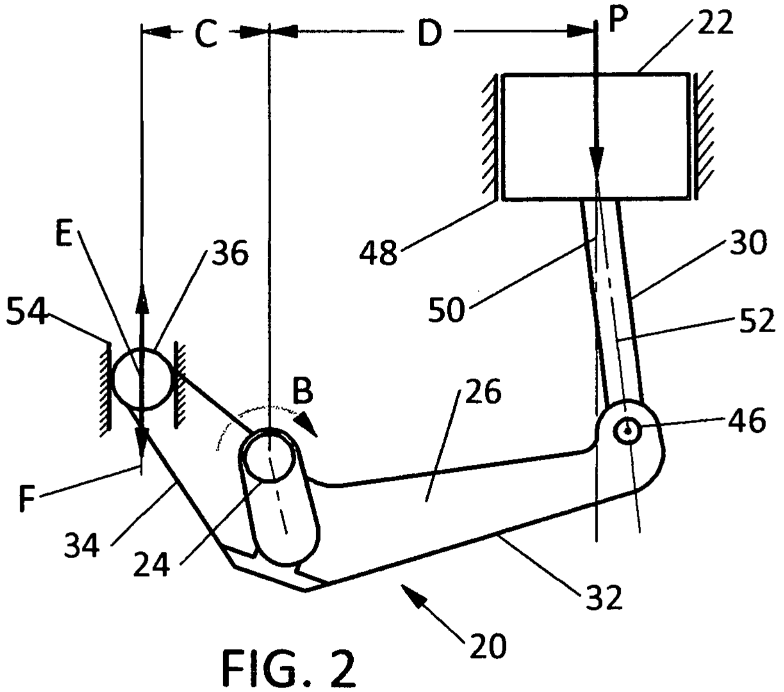
FIG. 2 Prior Art
FIG. 2 is a schematic diagram of the prior art of a reciprocating piston mechanism with extended piston offset to illustrate conversion of reciprocating motion of a piston to rotational motion of a crankshaft.

FIG. 2 is a schematic diagram of the front elevation of the prior art reciprocating piston mechanism with extended piston offset 20 to illustrate conversion of reciprocating motion of the piston 22 to rotational motion of the crankshaft 24. The schematic diagram of the apparatus 20 is enhanced by adding a schematic representation of a cylinder 48 and a schematic representation of a confined pathway/guide 54. This assembly serves to convert the reciprocating motion of the piston 22 as indicated by arrow A to the rotational motion of the crankshaft 24 as indicated by arrow B. The rollers 36, of the arm 34 of the rocker arm/lever assembly 26, can move only along substantially defined line “F” at a fixed distance “C” from the axis of rotation 42 of the crankshaft 24 in the confined pathway/guide 54 (shown schematically). The exact direction of that line, as well as configuration of the confined pathway/guide is defined by overall design requirements of an engine. That controlled movement of the rollers 36, which are pivotally mounted in the opening 40 of the extended arm 34 of the rocker arm/lever assembly 26 guarantees that the rocker arm/lever assembly 26 does not spin around the crankshaft axis 42 but instead forces rotation of the crankpin 28 of the crankshaft 24 around the crankshaft axis 42. Distance between the top and bottom positions of the piston 22 within the cylinder 48 is defined as a piston stroke. The rollers 36 of the extended arm 34 of the rocker arm/lever assembly 26 serve as well as a fulcrum, which is designated by letter “E”, of the rocker arm/lever assembly 26. Letter “D” specifies offset of the cylinder center line from the axis of rotation 42 of the crankshaft 24 which is always greater than 0.

Figure 3:
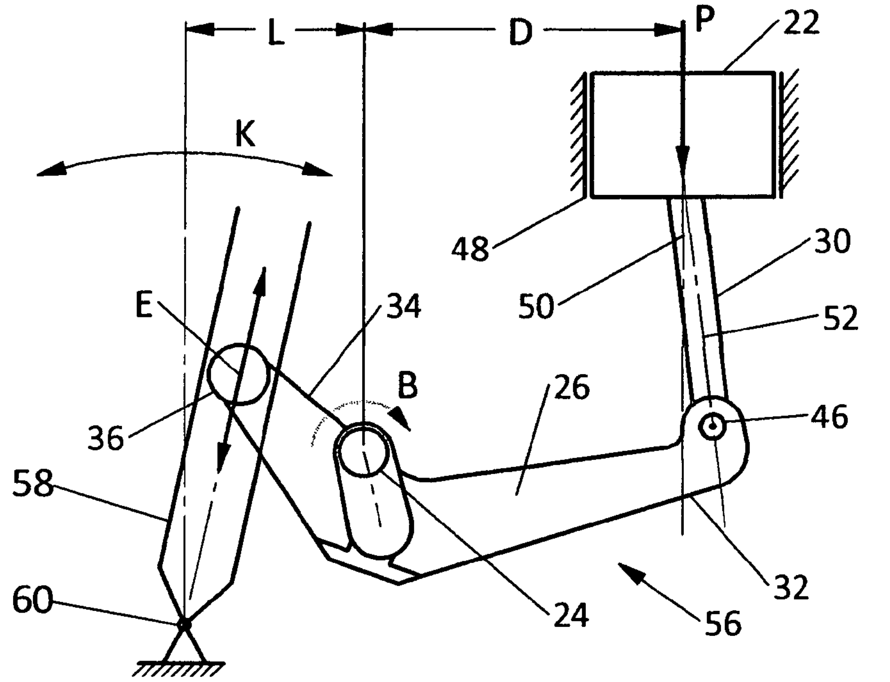
FIG. 3 is a schematic diagram of a variable compression ratio apparatus with a reciprocating piston mechanism with extended piston offset with a pathway/guide of the present invention having a pivot.

FIG. 3 is a schematic diagram 56 of the front elevation of a variable compression ratio apparatus with a reciprocating piston mechanism with extended piston offset with a pathway or a guide 58 of the present invention having a pivot 60. The schematic diagram of the mechanism 20 is enhanced by adding a schematic representation of the cylinder 48 and a schematic representation of the pathway/guide 58 of the present invention having the pivot 60. The rollers 36, of the arm 34 of the rocker arm/lever assembly 26, in this case can move back and forth only within confines of the pathway/guide 58 (shown schematically) of the present invention. This pathway/guide 58 can swing from side to side as indicated by arrow “K” on the pivot 60 which is installed at a predetermined by design position, and distance “L” from the axis of rotation 42 of the crankshaft 24. The exact configuration of the pathway/guide 58 and the range of the swing which it travels are predetermined by design parameters.

Figure 4:
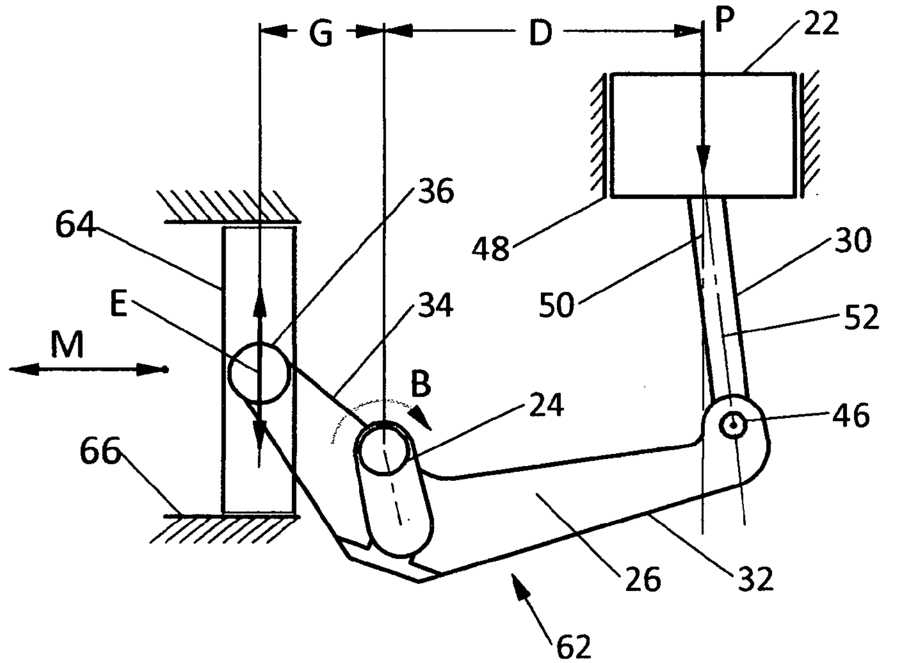
FIG. 4 is a schematic diagram of a variable compression ratio apparatus with a reciprocating piston mechanism with extended piston offset with a pathway/guide of the present invention moveable along a predefined path.

FIG. 4 is a schematic diagram 62 of the front elevation of a variable compression ratio apparatus with a reciprocating piston mechanism with extended piston offset with a pathway or a guide 64 of the present invention moveable along a line. The schematic diagram of the mechanism 20 is enhanced by adding a schematic representation of the cylinder 48 and a schematic representation of the pathway/guide 64 of the present invention moveable along a predefined path. The rollers 36, of the arm 34 of the rocker arm/lever assembly 26, can move back and forth only within confines of the pathway/guide 64 (shown schematically) of the present invention. This pathway/guide 64 can move only along a predefined path towards and away from the crankshaft 24 as indicated by arrow M within its own track 66 (shown schematically). Dimension “G” indicates changing positions of the pathway/guide 62 as it moves along the path. The exact configuration of the pathway/guide 62 as well as direction of the path and distance the pathway/guide 62 moves is predetermined by design parameters.

Neither inlet and outlet valves nor corresponding camshafts and spark plugs are shown in FIGS. 1 through 4 because they are not affected in any way by the current invention.

An apparatus of the invention for varying compression ratio for engines and for reducing the fuel consumption of the internal combustion engine comprises a crankshaft, a connecting rod and a piston of a conventional internal combustion engine with the device of the present invention that contains at least one cylinder having a longitudinal axis, at least one piston that has a pivot pin and is slidingly installed in the cylinder, a crankshaft, which is offset at a distance from the longitudinal axis of the cylinder, a rocker arm/lever assembly pivotally mounted on an offset rod journal, or a crankpin of the crankshaft, and a connecting rod connecting the piston and one end of the rocker arm/lever. The other end of the rocker arm/lever assembly can move back and forth only within confines of a pathway/guide, direction or position of which can be altered by any suitable means as required by working parameters of the engine during rotation of the driveshaft.

During the operation, combustion inside the cylinder 48 (shown schematically) results in force P acting upon the piston 22 along a center line or axis 50 of the cylinder 48, and moving the piston 22 from its top position in the cylinder 48 down the cylinder. Force P is transmitted to the rocker arm/lever assembly 26 in the direction from the wrist pin 44 (FIG. 1) disposed inside the piston 22 to an opening 46 of the extended arm 32 of the rocker arm/lever assembly 26 along the centerline 52 of the connecting rod 30. The cylinder center line 50 is at the same time a center line of the piston 22. As a result, the rollers 36 of the arm 34 of the rocker arm/lever assembly 26 can move only up along substantially defined line "F" in a confined pathway/guide 54, which in the prior art of a reciprocating piston of mechanism with extended piston offset (FIG. 2) is a vertical straight line. At the same time the crankshaft 24 turns clockwise as indicated by arrow "B". After going over the top dead center (TDC) the rotating crankshaft 24 is pulling down the rollers 36 mounted in the extended arm 34 of the rocker arm/lever assembly 26 resulting in upward movement of the piston 22. In this kind of a configuration with the fixed position of the confined pathway/guide 54, the TDC and the bottom dead center (BDC) of the crankshaft as well as the top and bottom positions of the piston in the cylinder, i.e. the stroke, are determined and fixed by the design and, as a result, the combustion ratio, which is a ratio of a maximum value to a minimum value of the volume of a combustion chamber, is fixed. Distance between TDC and BDC of a crankshaft and a stroke are not equal in a reciprocating piston mechanism with extended piston offset, whereas they are equal in a conventional reciprocating piston mechanism.

When the pathway/guide 58 (FIG. 3) of the present invention swings from side to side as indicated by arrow "K", the stroke positions of the piston 22 within the cylinder 48 change and correspond to a particular turn of the pathway/guide 58. The range of the swing is predetermined by design parameters and defines the range of the positions of the stroke within the cylinder 48 and thus changes in the ratio of the maximum value to the minimum value of the volume of the combustion chamber, the volume changing with a reciprocal movement of the piston.

The same is happening when the pathway/guide 64 (FIG. 4) of the present invention moves along the predefined path towards and away from the crankshaft 24 as indicated by arrow M within its own tracks 66. The stroke positions of the piston 22 within the cylinder 48 change and correspond to a particular position of the pathway/guide 64. The range of the movement is predetermined by design parameters and defines the range of the positions of the stroke within the cylinder 48 and thus changes in the ratio of the maximum value to the minimum value of the volume of the combustion chamber, the volume, changing with a reciprocal movement of the piston.

In FIGS. 5 & 6 the same variable compression ratio apparatus of FIG. 4 is shown to illustrate how a change only of the dimension "G" of the position of the pathway/guide 64 from the axis of rotation 42 of the crankshaft 24 from 1" to 2.50" changes position of the piston 22 within the cylinder 48, from the axis of rotation 42, from 3.76" to 7.38" respectively at the same rotational position of the crankshaft 24. In practice, just a .25" change of the dimension "G" of the position of the pathway/guide 64 of the apparatus of FIG. 4 will result in a change of compression ratio from 8 to 18 for an engine with 4" stroke. The same compression ratio variation will result with a 4° swing of the pathway/guide 58 of the apparatus of FIG. 3 for an engine with the same 4" stroke. For both apparatus of FIG. 3 and apparatus of FIG. 4, the roller 36 of the rocker arm/lever assembly 26 is rolling up and down on alternative sides of each of the pathway/guides 58 and 64 respectively. This rolling introduces a force on the respective sides of the pathway/guides which can be used to move the respective pathway/guides in direction of the force. Therefore, changes of the position of the respective pathway/guides would be performed by using only a fraction of the piston force.

In operation, a conventional engine controller, such as a programmable controller used in a vehicle to capture various vehicle parameter signals, can be used to control signals derived from combinations of sensed engine parameter conditions, such as load conditions, and to generate control signals, should conditions exist where it is desirable to selectively adjust direction or position of a pathway/guide, in order to adjust the compression ratio of an engine.

Thus, it has been shown that the apparatus of the invention performs its functions substantially in the same way as a conventional reciprocating piston mechanism with a crankshaft type but with an ability of adjusting compression ratio of an engine. In other words, the apparatus of the invention provides an alternative to a conventional reciprocating piston mechanism with a crankshaft for an internal combustion engine with added control and variation of the volume of the combustion chamber of a cylinder in order to achieve improved fuel economy and increased engine power performance that is simple in design and easier to manufacture. By adding a rocker arm/lever assembly with either pivoted or moveable pathway/guide, this apparatus provides additional tools to build a better engine.

While preferred embodiments have been shown and described, various modifications and substitutions may be made thereto without departing from the spirit and scope of the invention. In fact, having illustrated and described the principles of the invention with reference to a number of embodiments, it should be apparent to those of ordinary skill in the art that various mechanisms and systems can be utilized to pivot or move a pathway/guide of the invention without departing from these principles. Furthermore, configurations and dimensions of the pathway/guide are to be defined by requirements of a particular design. Even though only two positions of a pathway/guide are indicated on the drawings, the pathway/guide can be positioned anywhere outside of a crankshaft and directions of its restricted movement can vary as well. It is also assumed that pivot position of the pathway/guide or its tracks types and positions will be determined by specific design constrains. Accordingly, it is to be understood that the present invention has been described by way of illustration and not limitation.

What is claimed is:

1. A variable compression ratio apparatus with a reciprocating piston mechanism comprising:

a piston slidingly installed in at least one cylinder;

a connecting rod pivotally connected to a wrist pin of the piston;

a main crankshaft having a central axis, a crank, and a crankpin on the crank;

a lever assembly pivotally mounted on the crankpin of the crankshaft, the lever assembly having a first arm and a second arm;

the first arm being pivotally connected to the connecting rod on a first end of the first arm and pivotally connected to the crankpin on a second end of the first arm;

the second arm being pivotally connected to the crankpin on a first end of the second arm and having a roller rotationally installed on a second end of the second arm;

the roller being slidingly installed within a pathway which has a predetermined confined path in which the roller may change position, wherein the roller functions as the fulcrum of the lever assembly; and the pathway being separate from the lever assembly and being able to change its position with respect to the crankshaft in response to changes in the engine load in order to change the compression ratio of the variable compression ratio apparatus.

2. The variable compression ratio apparatus according to claim 1, wherein said pathway for guiding said roller has a pivot for swinging from side to side.

3. The variable compression ratio apparatus according to claim 1, wherein said pathway has a track for guiding said pathway towards and away from the crank.

* * * * *